Oct. 19, 1926.
C. C. BLAKE
1,603,935
MACHINE FOR AND METHOD OF MAKING STAPLES
Filed Nov. 6, 1920  2 Sheets-Sheet 2
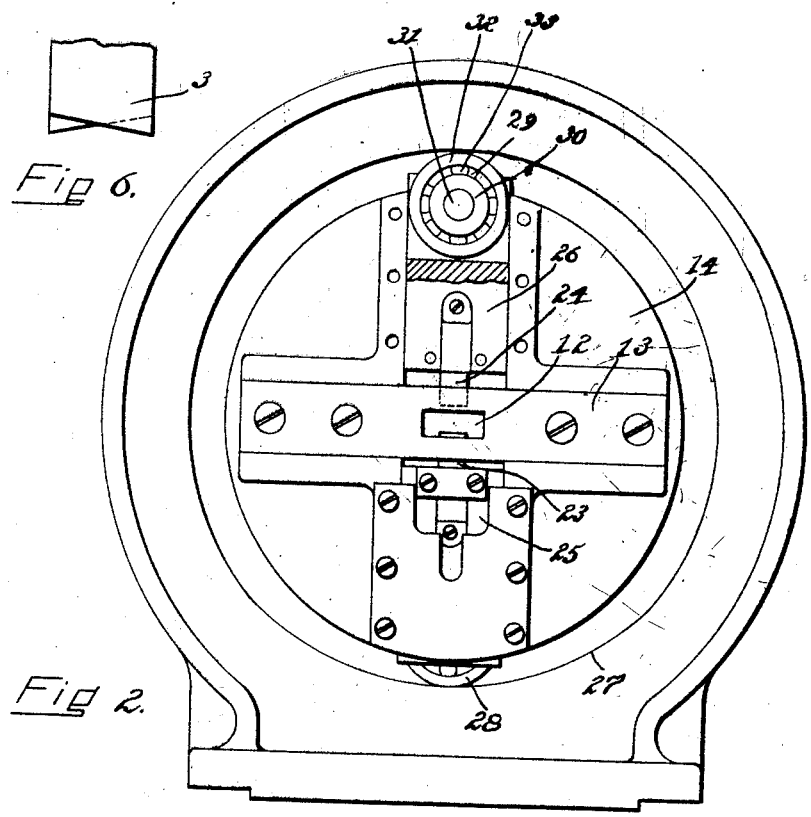
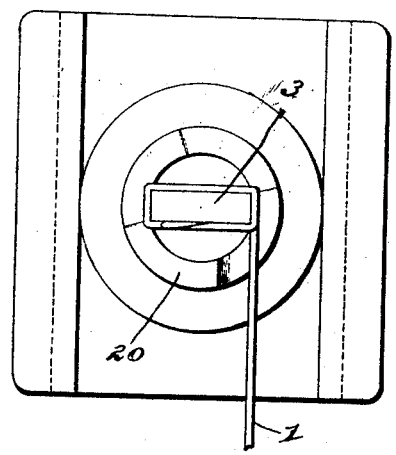
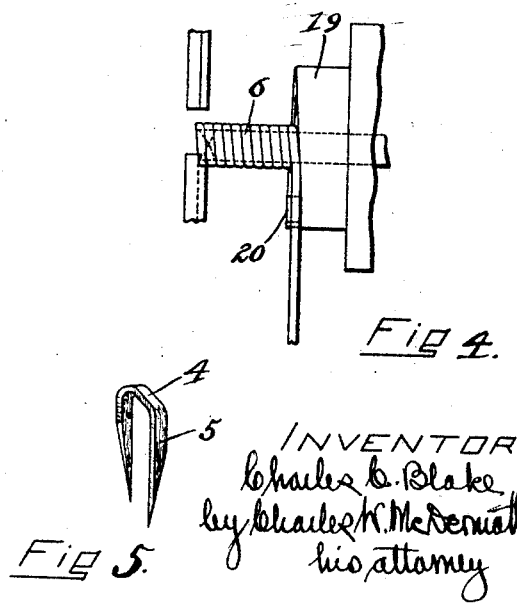

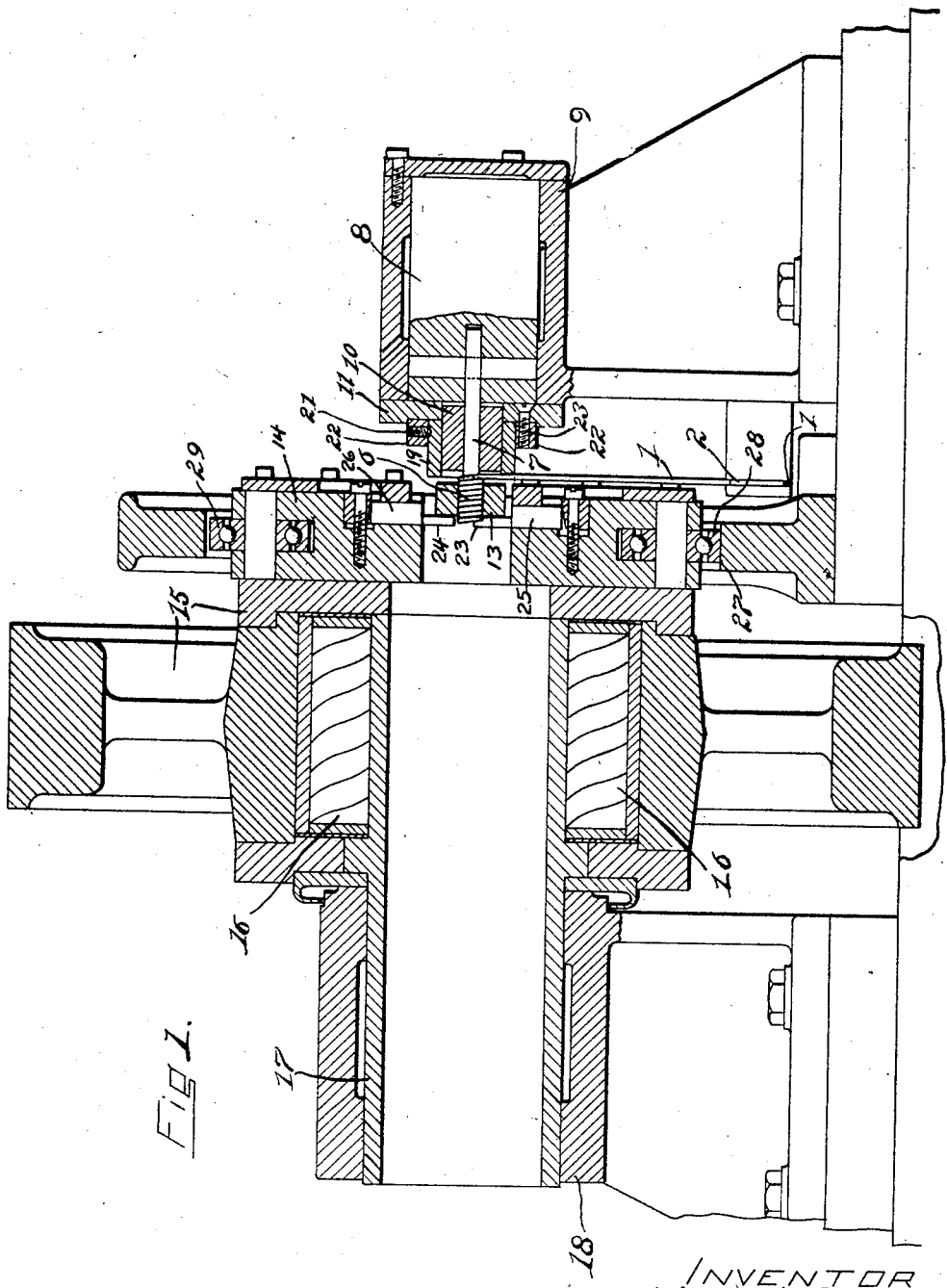

Patented Oct. 19, 1926.

1,603,935

UNITED STATES PATENT OFFICE.

CHARLES C. BLAKE, OF BROOKLINE, MASSACHUSETTS.

MACHINE FOR AND METHOD OF MAKING STAPLES.

Application filed November 6, 1920. Serial No. 422,277.

The present invention relates to the art of making double-ended articles such, for instance, as staples.

In the present commercial machines for making staples the wire, from which the staples are made, at the commencement of each cycle of operations is located on a source of supply with the free end of the wire pointed to form one end of the staple. The cycle of operations performed on the wire to make a staple consists in feeding a length of wire sufficient for the staple from the source of supply, cutting diagonally through the wire to point the other end of the staple and separate the length of wire from the wire on the source of supply, shaping the cut-off length of wire between formers to shape the head or shoulder of the staple, and finally stripping the finished staple from the formers. Considerable time is consumed in performing the feeding, forming and stripping steps as the stroke of the feed must be equal to the length of the wire in a staple, and the stroke of the formers and the stroke of the stripper must be greater than the height of the staple. As the steps of feeding, cutting, forming and stripping are performed successively the output of staples in the present commercial machines is definitely limited by the time consumed in performing the feeding, cutting, forming and stripping steps.

The object of the present invention is to devise a method of making, from a wire, double-ended articles, such as staples, cotter pins and the like which will produce a satisfactory product in greater quantities per unit of time than has heretofore been found possible.

To the accomplishment of this object a feature of the present invention contemplates the production from a wire of double-ended articles such as staples, cotter pins and the like by first bending the wire to shape the article and thereafter severing the wire on opposite sides of the bend to form the ends of the article while leaving all the bends intact.

Broadly considered the successive steps of bending and cutting of the wire may be carried out in any manner found desirable or expedient as I have found that this method of making staples is much faster than any method heretofore devised.

I prefer, however, to form a succession of bends in the wire to form the heads or shoulders of a plurality of staples and then to cut the wire between the bends to form the ends of the staples and separate them from the wire. Obviously, I may cut the wire between the bends to simultaneously form the ends of a plurality of staples but to insure continuity it is more desirable to cut the wire between the bends successively so that the cut may be made while the wire is being bent in readiness for the cut. Stated in another way, after a succession of bends have been produced in the wire to form the heads or shoulders of a plurality of staples, a cut is made between two of the bends simultaneously with the formation of a new bend in the wire and these operations are continued repeatedly until the wire is exhausted from the source of supply. More specifically, I wind the wire about a rotating mandrel oblong in cross section to form the heads or shoulders of a plurality of staples and I feed the coils of wire along the mandrel to a point where a cut may be made between two of the shoulders. I make a cut between the shoulders at every half revolution of the mandrel so that two staples are produced at each rotation of the mandrel. As the mandrel is continuously rotated the wire is constantly being drawn from the source of supply, then wound in coils on the mandrel to form the heads or shoulders of the staples, and these coils are then fed to the cutting point where the cut is made between the shoulders to form the ends of the staples and sever them from the wire on the rotating mandrel.

By my method I have reduced the time of making a staple to the time required to make the short stroke of the cutter as the wire is bent to form the head or shoulder of a staple and a fresh length of wire is drawn from the source of supply during the stroke of the cutter. I have therefore saved all the time required in the old method for the feeding, forming and stripping steps. Obviously the present invention initiates an important advance in the art of making staples or other double pointed or ended articles.

The present invention will be best understood from an inspection of the accompanying drawings illustrating the best form of the invention at present devised, in which—

Figure 1 is a central sectional elevation of a machine for making staples;

Fig. 2 is a right side elevation showing the rotating plate and cutters carried thereby and operating mechanism for the cutters;

Fig. 3 is a detail in left side elevation of the mandrel, the coil feeding cam and the course of the wire from the source of supply;

Fig. 4 is a detail in front elevation of the mandrel, the coil feeding cam and the position of the cutters advanced and withdrawn, respectively;

Fig. 5 is a perspective of a staple made by the machine in accordance with the present invention; and Fig. 6 is a detail in bottom plan of the end of the mandrel.

In practicing the present invention the wire 1, from a suitable source of supply (not shown), is led beneath a guide roll 2 (Fig. 1) to a mandrel 3 (Fig. 3). This mandrel is oblong in cross section so that when the wire is coiled thereon (Figs. 1 and 4) the mandrel will bend the wire and thus form the head or shoulder 4 of the staple 5 (Fig. 5). The mandrel is rotated during the operation of the machine to draw wire continuously from the source of supply and wind the wire in a plurality of coils 6 (Figs. 1 and 4) about the mandrel.

To this end the mandrel 3 is formed on the end of a bar 7 (Fig. 1) which is secured to a piston 8 rotatably mounted in a cylinder 9 on the machine frame. The bar 7 is also secured to a second piston 10 rotatably mounted in a cover piece 11 for the cylinder 9.

In order to rotate the mandrel 3 the coils of wire thereon are engaged by the sides of an opening 12 (Fig. 2) in a bar 13 secured to a rotary plate 14. The plate 14 is secured to a pulley 15 which is driven during the operation of the machine by a belt (not shown) from some suitable source of power. The pulley 15 rotates on a series of roller bearings 16 interposed between the pulley and a cylindrical tube 17 secured to a bearing 18 on the machine frame.

During the rotation of the mandrel the wire is drawn from the source of supply and wound in coils about the mandrel. In order for each of the coils to be fed along the mandrel to make room for a fresh supply of wire the cover piece 11 (Fig. 1) carries a stationary tube 19 provided with a cam face 20 (Figs. 3 and 4) which during the rotation of the mandrel engages the last coil of wire on the mandrel and pushes it with the other coils along the mandrel. The cam face 20 feeds the coils a distance corresponding to the gauge of wire used. To permit the removal of the tube 19 and the substitution of another tube having a cam face 20 thereon shaped to feed wire of a different gauge the tube 19 is held in place by a set screw 21 carried by a ring 22 secured by a screw 23 to the cover piece 11.

With the construction described rotation of the mandrel will draw the wire from the source of supply and wind it in coils about the mandrel to shape the heads or shoulders of a plurality of staples, the cam face 20 acting to feed the coils toward the end of the mandrel.

In order to cut the wire between the shoulders and thus form the ends of the staples as the coils of wire reach the end of the mandrel, the plate 14 carries a pair of cutters 23 and 24 (Fig. 2). The cutters 23 and 24 are adjustably connected to slides 25 and 26, respectively, mounted to slide beneath the cover plates secured to the plate 14. The cutters 23 and 24 are operated by a stationary cam 27 on the machine frame which engages cam rolls 28 and 29 on the slides 25 and 26, respectively. The cam face 20 is designed to impart two quick feeding steps to the wire coils at each rotation of the mandrel with a dwell between each feeding step in order to temporarily suspend the feeding movement of the coils along the mandrel while a cutter is severing the wire.

During the rotation of the machine the cam rolls 28 and 29 travel continuously along the cam 27. When the cutters are in the position of Fig. 2 the lower cutter is elevated by the cam to shear through the wire at the end of the mandrel and form one end of the staple and separate it from the wire on the mandrel while the upper cutter is thrown into an inoperative position by centrifugal force. At the time the lower cutter is in operation the mandrel is in the position of Fig. 3. As shown in Fig. 3 the cut made by the cutter is diagonally across the wire so that the same cut which forms one end of the staple points the end of the wire on the mandrel to form the end of the next staple, the other end of which is formed by the other cutter at the next half revolution of the machine. With this construction two staples are formed at each revolution. During the operation of the cutters to cut the wire the bar 13 (Figs. 1 and 2) acts as an anvil on the coils of wire on the mandrel and corrects any tendency for the bend in the coil to bow across the top of the mandrel. This takes the spring out of the head of the staple.

In order to permit the cutters to shear diagonally across the wire the long sides of the end of the mandrel are reversely inclined (Fig. 6) and the adjacent faces of the mandrel are beveled slightly to form shearing edges cooperating with the cutters respectively. As the cutter shears across the end of the mandrel a completely formed staple is chopped off the wire on the mandrel and this staple drops into the tube 17.

Heretofore it has been a common practise to mount a cam roll for rotation on a stationary pin. Owing, however, to the high speed at which the cam roll rotates it is difficult to properly oil the cam roll and its bearing. To overcome this difficulty the cam rolls 28 and 29 are composed of two race rings one of which, the ring 30, is secured to a stationary pin 31 on the plate 14 and the other one of which, the ring 32, is rotatably mounted on balls 33, interposed between the rings. With this construction the oil may be maintained between the rings without danger of it being thrown out of the machine by centrifugal force.

To operate the machine the wire is drawn from the source of supply and wound by hand on the mandrel until sufficient coils have been made to cause their engagement with the sides of the opening in the bar 13. The machine is then thrown into operation. At every rotation of the mandrel enough wire is drawn from the source of supply to make two staples and this length of wire is wound about the mandrel to form the heads or shoulders of two staples. During the rotation of the mandrel the coils of wire thereon are fed by the cam face 20 towards the end of the mandrel. As the coils of wire reach the end of the mandrel each of the cutters shear across the end of the mandrel once for each revolution thereof thereby forming a staple at each cut. During the time required to make the stroke of the cutter to produce a staple a length of wire for a staple is being fed from the source of supply to the mandrel and bent thereon to form the head or shoulder of the staple.

Consequently, the feeding, forming and cutting steps of the present method are performed in the time it takes to make the stroke of the cutter. As this stroke is short the machine is operated at a very high speed resulting in an enormous output of staples.

What is claimed as new is:

1. That improvement in the art of making double-ended articles from a wire which consists in bending the wire to shape the article, and then cutting the wire on opposite sides of the bend, leaving all the bends intact to form the ends of the article.

2. That improvement in the art of making staples from a wire which consists in shaping the wire on a mandrel to form the heads and sides of a pair of staples and then cutting each side intermediate the heads to form the points of the pair of staples.

3. That improvement in the art of making double-ended articles from a wire which consists in coiling the wire on a mandrel to form a plurality of bends and then cutting the wire intermediate each successive bend.

4. That improvement in the art of making staples from a wire which consists in coiling the wire to form the head or shoulder of the staple, and then cutting the wire on opposite sides of the bend to form the ends of the staple.

5. That improvement in the art of making staples from a wire which consists in bending the wire on a mandrel to form the head or shoulder of the staple, and then cutting the wire on the mandrel on opposite sides of the bend to form the ends of the staple.

6. That improvement in the art of making staples from a wire which consists in coiling the wire on a mandrel oblong in cross section, and then cutting the wire on the long sides of each coil.

7. That improvement in the art of making staples from a wire which consists in feeding the wire to a mandrel oblong in cross section, rotating the mandrel to coil the wire thereon, and cutting the wire on the long sides of each coil during the rotation of the mandrel.

8. That improvement in the art of making staples from a wire which consists in feeding the wire to a mandrel oblong in cross section, rotating the mandrel to coil the wire thereon, feeding the coils of wire along the mandrel, and cutting the wire on the long sides of each coil during the rotation of the mandrel.

9. That improvement in the art of making staples from a wire which consists in coiling the wire on a mandrel oblong in cross section, and then cutting diagonally across the wire on the long sides of each coil.

10. That improvement in the art of making staples from a wire which consists in coiling the wire on a rotating mandrel, and cutting the wire on the long sides of each coil whereby two staples are produced at each rotation of the mandrel.

11. That improvement in the art of making staples from a wire which consists in forming a plurality of bends in a length of the wire to form the heads or shoulders of a plurality of staples and then cutting the wire between the bends, leaving all the bends intact to form the ends of the staples and cut them out of the wire.

12. That improvement in the art of making staples from a wire which consists in forming a plurality of bends in a length of the wire to form the heads or shoulders of a plurality of staples and then cutting the wire between the bends successively, leaving all the bends intact to form the ends of the staples and cut them out of the wire.

13. A machine for making staples, having, in combination, means for bending the wire to form the head or shoulder of the staple, and means for cutting the wire on opposite sides of the bend to form the ends of the staple.

14. A machine for making staples, having, in combination, a mandrel oblong in cross section, means for coiling the wire on the mandrel to form the head or shoulder of the staple, and means for cutting the wire on opposite sides of the shoulder to form the ends of the staple.

15. A machine for making staples, having, in combination, a mandrel oblong in cross section, means for rotating the mandrel to draw the wire from a source of supply and coil the wire about the mandrel to form the head or shoulder of the staple, and means for cutting the wire on the long sides of each coil.

16. A machine for making staples, having, in combination, a mandrel oblong in cross section, means for rotating the mandrel to draw the wire from a source of supply and coil the wire about the mandrel to form the head or shoulder of the staple, means for feeding the coils along the mandrel, and means for cutting the wire on the long sides of each coil.

17. A machine for making staples, having, in combination a rotary drum, a bar having an oblong opening therein carried by the drum, a mandrel rotatably mounted and arranged to pass freely through the opening in the bar whereby a coil of wire on the mandrel will be engaged by the sides of the opening in the bar and cause the mandrel to rotate with the drum.

18. A machine for making staples, having, in combination, a mandrel constructed to support a coil of wire, and cutting mechanism constructed and arranged to cooperate with the free end of the mandrel and shear each coil of the wire.

19. A machine for making staples, having, in combination, a mandrel oblong in cross section constructed to support wire coiled about the mandrel, and cutting mechanism constructed and arranged to cooperate with the free end of the mandrel and shear the wire on the long sides of each coil.

20. A machine for making staples, having, in combination, cutting mechanism for forming the ends of the staple, bending mechanism for forming the heads or shoulders of the staples, and means for transferring the product of the bending mechanism to the cutting mechanism.

21. A machine for making staples, having, in combination, cutting mechanism for forming the ends of the staple, and bending mechanism for forming the heads or shoulders of the staples and drawing the wire from the source of supply.

22. A machine for making staples, having, in combination a mandrel oblong in cross section constructed to support wire coiled about the mandrel and having its long sides reversely inclined and the adjacent faces beveled to form shearing edges, and cutting mechanism constructed and arranged to cooperate with the shearing edges of the mandrel and shear the wire diagonally across the long sides of each coil.

23. A machine for making staples, having, in combination, a mandrel, means for rotating the mandrel to draw the wire from a source of supply and coil the wire about the mandrel, and a cam constructed to impart two quick feeding steps to the coils on the mandrel during each rotation thereof.

24. A machine for making staples, having, in combination, a mandrel, means for rotating the mandrel to draw the wire from a source of supply and coil the wire about the mandrel, a cam constructed to impart two quick feeding steps to the coils on the mandrel during each rotation thereof, and cutting mechanism acting between each feeding step to sever a coil.

In testimony whereof I have signed my name to this specification.

CHARLES C. BLAKE.